United States Patent
Kavanappillil et al.

(10) Patent No.: US 7,058,853 B1
(45) Date of Patent: Jun. 6, 2006

(54) HIGHLY AVAILABLE TRANSACTION PROCESSING

(75) Inventors: Ramesh Kavanappillil, Cupertino, CA (US); Shivaji Ganesh, Milpitas, CA (US); Curtis P. Kolovson, Redwood City, CA (US); Richard H. Van Gaasbeck, Mountain View, CA (US); Ewald Comhaire, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 873 days.

(21) Appl. No.: 09/879,404

(22) Filed: Jun. 11, 2001

Related U.S. Application Data

(60) Provisional application No. 60/210,862, filed on Jun. 9, 2000.

(51) Int. Cl.
*G06F 11/00* (2006.01)

(52) U.S. Cl. .......................................... 714/13; 709/213
(58) Field of Classification Search .................... 714/13, 714/6, 8, 42, 47, 11, 12, 7, 15, 18, 43; 709/216, 709/217, 221, 218; 711/134, 133
See application file for complete search history.

(56) References Cited

U.S. PATENT DOCUMENTS

| | | | | |
|---|---|---|---|---|
| 5,781,912 A | * | 7/1998 | Demers et al. ............. | 707/202 |
| 6,044,444 A | * | 3/2000 | Ofek ........................... | 711/162 |
| 6,108,300 A | * | 8/2000 | Coile et al. .................. | 370/217 |
| 6,163,856 A | * | 12/2000 | Dion et al. ..................... | 714/4 |
| 6,199,110 B1 | * | 3/2001 | Rizvi et al. .................. | 709/227 |
| 6,230,281 B1 | * | 5/2001 | Brodfuhrer et al. ............ | 714/4 |
| 6,324,580 B1 | * | 11/2001 | Jindal et al. ................. | 709/228 |
| 6,324,654 B1 | * | 11/2001 | Wahl et al. .................... | 714/6 |
| 6,442,706 B1 | * | 8/2002 | Wahl et al. .................... | 714/6 |
| 6,618,818 B1 | * | 9/2003 | Wahl et al. .................... | 714/6 |

* cited by examiner

*Primary Examiner*—Nadeem Iqbal

(57) ABSTRACT

A generalized architecture for a highly available transaction processing system that combines commercially available components and software components specifically developed to implement the architecture into an integrated, highly available transaction processing system that minimizes planned and unplanned downtime, minimizes data loss in the event of failures, provides proactive monitoring of both hardware and software components of the highly available transaction processing system, provides automated recovery actions that involve fast failover, either locally to an Inactive Node, or remotely to a Standby Site, and provides an easy-to-use graphical-user-interface-based management interface that provides service-oriented views of the state of the system, with context-directed commands and meta-commands to guide managers in execution of their tasks.

12 Claims, 8 Drawing Sheets

5NINES Architecture Overview – Physical Systems View

Mapping of Control Components to Physical Systems

HIGHLY AVAILABLE TRANSACTION PROCESSING

CROSS-REFERENCE

This application claims the benefit of provisional application Ser. No. 60/210,862, filed Jun. 9, 2000.

TECHNICAL FIELD

The present invention is related to highly available transaction processing systems that include redundant system components to which transaction processing can be failed over, and, in particular, to a highly available transaction processing system that provides fast failover of a primary database management system to a remote database management system, sat restoration of database management processing from a remote database management system to a primary database management system, high-speed database replication, an application-level programming interface through which status information concerning database replication can be obtained, and system status display and other system management tools.

BACKGROUND OF THE INVENTION

Highly available transaction processing systems have been the subject of much research and many computer system and database management systems "DBMS") design efforts during the past 30 years. Highly available transaction processing systems are generally designed to include redundant components, so that when one of a set of redundant components fail, another of the set of redundant components can quickly replace the failed component to allow for continued operation of the system.

Failover from a failed hardware device to a redundant replacement component involves detecting the failure, mapping the failure onto an internal map of the transaction processing system, restoring operation with an operational redundant component in place of the failed component, and restarting and resynchronizing software processes interrupted by the component failure. In many cases, transaction processing is failed over to a complete, redundant system remotely located from a failed primary system until operation of the failed primary system is restored.

Currently available highly available transaction processing systems suffer from a number of deficiencies. In many such systems, for example, the step of restarting and resynchronizing software processes interrupted by the component failure is imperfect. In many cases, a number of different software processes are currently operating within a transaction processing system, and must be started in a particular order with respect to one another. However, such ordered launching of software processes is not configured into the failover process, so that an attempted failover that incorrectly launches a number of software processes in a an order different than the required order may fail, or may produce incorrect system operation. As another example, software processes often precede to process subsequent transactions before waiting for data related to an already processed transaction to be redundantly stored in multiple, non-volatile data storage devices so that the data related to the processed transaction is fully recoverable despite any of a wide variety of failure conditions. Moreover, currently available lack convenient interfaces to allow an application program or database management system to determine the status of a replication operation launched in order to replicate data from a primary system to a redundant, remote system. Thus, a hard failure of a primary system that results in termination of software processes may result in unrecoverable data loss that, in turn, results in unrecoverable loss of completed transactions. In certain cases, inconsistencies between data stored on a primary and on a remote transaction processing system may lead to halting of software processes. Many currently-available high availability transaction processing systems to not provide automated system monitoring, and do not provide useful and complete management tools for system managers who need to manage the systems.

SUMMARY OF THE INVENTION

One embodiment of the present invention is a generalized architecture for a highly available transaction processing system that combines commercially available components and software components specifically developed to implement the architecture into an integrated, highly available transaction processing system that minimizes planned and unplanned downtime, minimizes data loss in the event of failures, provides proactive monitoring of both hardware and software components of the highly available transaction processing system, provides automated recovery actions that involve fast failover, either locally to an Inactive Node, or remotely to a Standby Site, and provides an easy-to-use graphical-user-interface-based management interface that provides service-oriented views of the state of the system, with context-directed commands and meta-commands to guide managers in execution of their tasks. Components of the highly available transaction processing system include (1) operations management and smart plug-n modules that are responsible for all aspects of monitoring and managing the systems and modules of the highly available transaction processing system; (2) a service navigator module that is responsible for providing a hierarchical view of services corresponding to the systems and modules that implement the highly available transaction processing system; (3) a global control module that is responsible for coordinating all the actions taken by local control modules at the primary site and the standby site; (4) a local control module that is responsible for coordinating all the actions taken by all of the functional modules at a given site; (5) error analyzer modules that analyze error messages to determine what recovery actions should be initiated in order to remedy the error condition; (6) a remote mirroring module that is responsible for replicating data to a remote site by remotely mirroring disk writes; (7) database modules that are responsible for controlling and monitoring database functionality at the primary standby sites; (8) a database backup module that is responsible for periodically taking business copies of the database at both the primary and remote sites; (9) an archive log handling module that is responsible for the management of database archive log files at both the primary and standby sites; and (10) a tuxedo module that is responsible for managing customer applications and their communication with the database at the primary site.

DETAILED DESCRIPTION OF THE INVENTION

Figure 1:
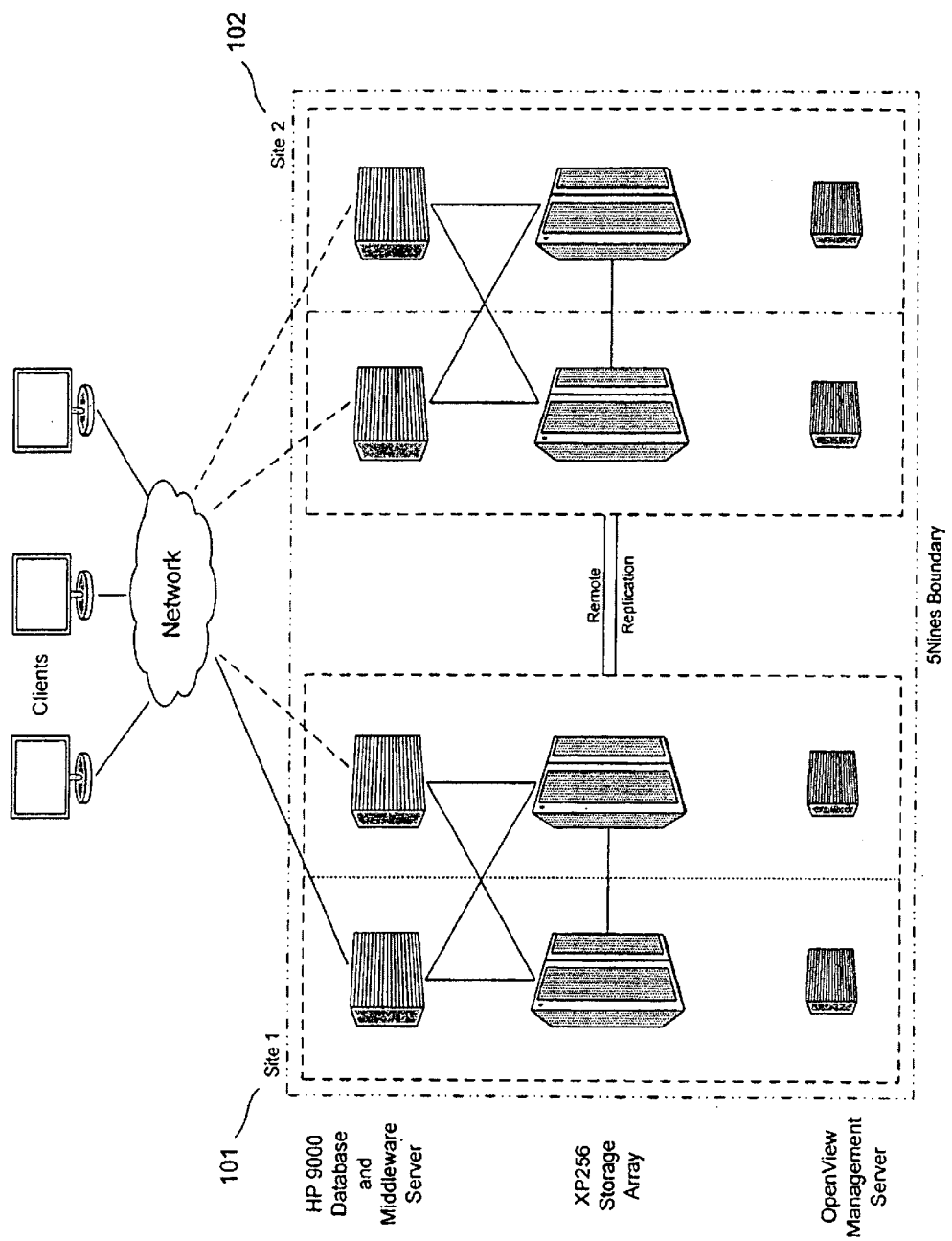
FIG. 1 shows the 5Nines:5Minutes High Availability Configuration.
Figure 2:
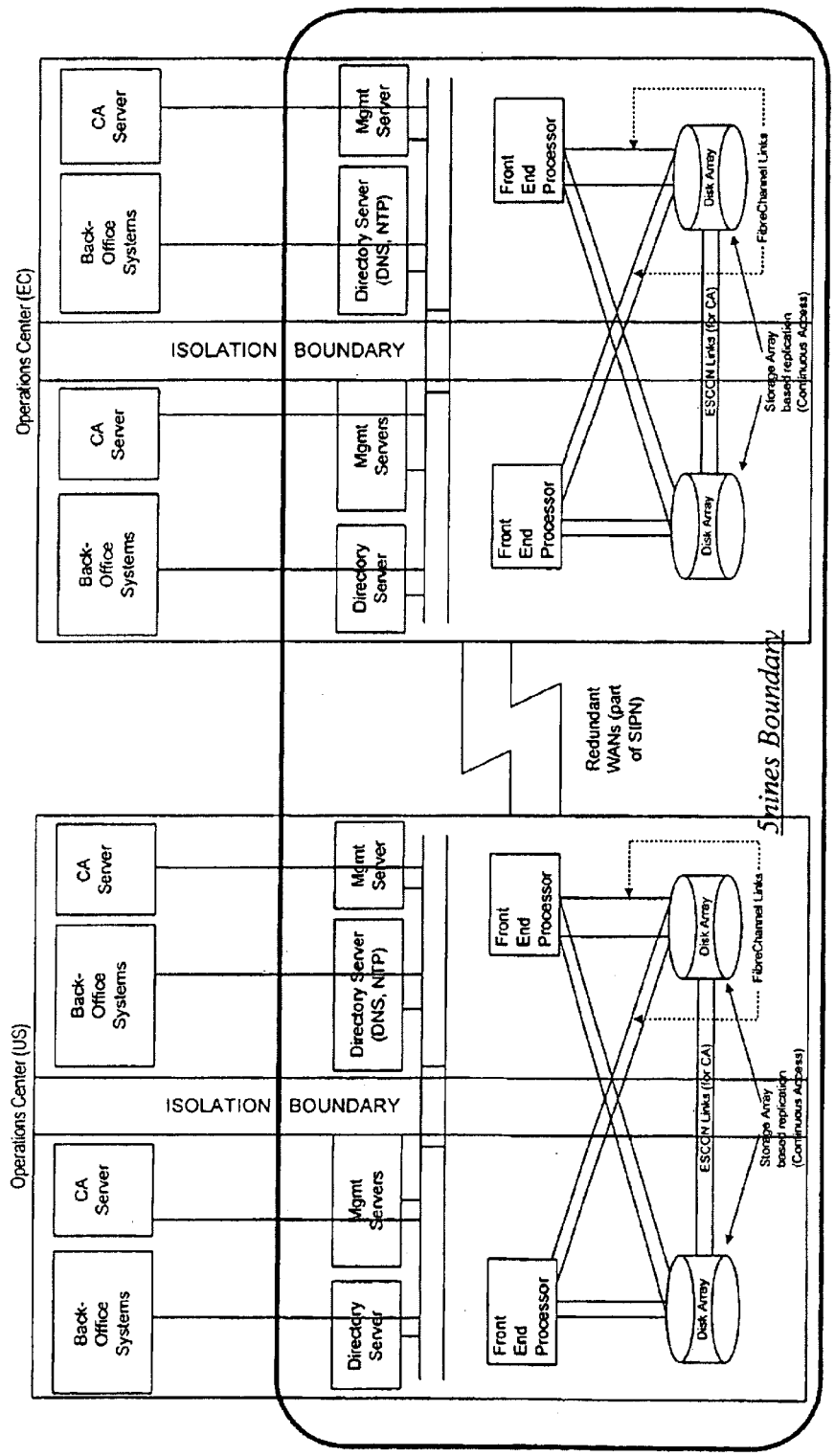
FIG. 2 shows an overview of the 5Nines Architecture.
Figure 3:
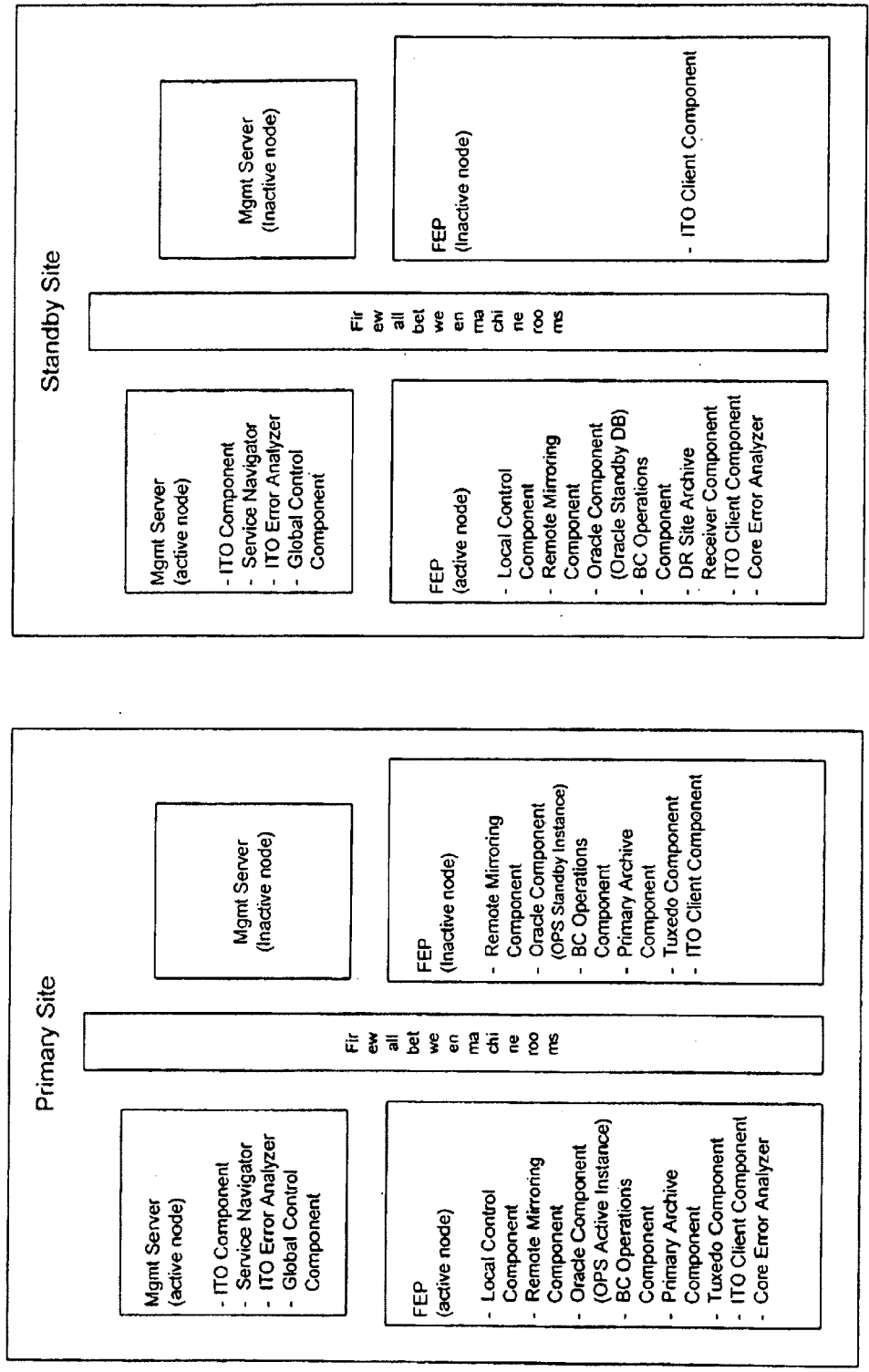
FIG. 3 shows mapping of control components to physical systems.

The 5nines:5minutes architecture provides highly available database transaction processing based on standard components including HP 9000 HP-UX platforms, HP Surestore E XP256 enterprise storage, the Oracle OPS database, the BEA Tuxedo transaction monitor, and the HP OpenView management infrastructure The fundamental topology is shown in FIG. 1: 5Nines:5Minutes High Availability Configuration and includes two geographically distributed clusters 101–102 of two nodes each to provide both inter-site and intra-site failover, and inter-site disaster recovery and role reversal with minimum disruption to client applications.

The focus of the architecture is to extend open systems-based high availability solutions with significant enhancements in areas including:

High-speed, asynchronous, long distance (WAN) database replication.

An application-level API to query the status of the remote replication.

Rapid role reversal including:

Fast remote failover, i.e. moving the active Oracle OPS instance from the primary to the standby or disaster recover (DR) site.

Fast restoration of 2-safe, i.e. bringing up the original primary as a standby site without requiring a complete database copy.

Improved service state display using OpenView Service Navigator.

Management tools including Cisco Smart plug in (SPI) into ITO infrastructure, OS SPI, Tuxedo SPI, XP256 SPI and OPS SPI.

The components responsible for maintaining services that are key to the 5nines Architecture and solution include the following:

Management and monitoring components

IT/Operations Management and Smart Plug In

Service Navigator

Control Components

Global Control

Local Control

Error Analyzers

Functional Components

Remote Mirroring

Oracle

Business Copy (BC) Operations

Archiving

Tuxedo

Mass Storage

DESCRIPTION OF COMPONENTS

Management and Monitoring Components

IT/Operations Management and ITO Smart Plug In (SPI) Components

The IT/O Component is responsible for all aspects of monitoring and managing the systems and components that are part of the 5nines Architecture. Associated with the IT/O Operation Management are Smart Plug-Ins (SPIs) for monitoring events and performance of key components of the 5nines Architecture such as the OS, the Oracle database, Tuxedo, Cisco devices and the HP SureStore E Disk Array XP256.

Service Navigator Component

The Service Navigator Component is responsible for providing a hierarchical view of services that are the systems and components that implement the 5nines solution. The component provides a tool for Operations Staff to do root cause analysis when error conditions occur.

Control Components

Global Control Component

The Global Control Component is responsible for coordinating all the actions taken by the Local Control Components at each of the two sites, i.e. the Primary Site and the Standby Site. The Global Control Component is the only component that issues commands that affect both sites, e.g. remote failovers, role reversal, etc. The Global Control Component communicates only with the Local Control Components.

Local Control Component

The Local Control Component is responsible for coordinating all the actions taken by all of the Functional Components at a given site, e.g. to coordinate local failover. There is one Local Control Component at the Primary Site, and one at the Standby Site.

Error Analyzer Components

The Error Analyzer Components, Core Error Analyzer (CEAC) and the IT/O based Error Analyzer (IEAC) analyze error messages that are sent by the 5Nines components to determine what recovery actions should be initiated in order to remedy the error condition. These recovery actions may either be automated or require manual intervention. Automated actions are automatically initiated in the 5nines Architecture and recovery actions requiring manual intervention will be documented as part of the 5nines solution.

The remaining Components are Functional Components, which are controlled by the Local Control Component at a given site.

Remote Mirroring Component (RM)

The Remote Mirroring Component is responsible for replicating data (e.g. Oracle redo logs) to a remote site by remotely mirroring disk writes. The Remote mirroring Component is implemented as a layer under Logical Volume Manager (LVM) layer in HP-UX, and preserves the order of write made across a local cluster of nodes to a geographically distant remote site. The Remote Mirroring component support a Status API, whereby the application can determine the progress of replication.

Oracle Database Component

The Oracle Database Component is responsible for controlling and monitoring the Oracle database functionality at the Primary or Standby Sites. At the Primary Site, the Oracle Component monitors the state of the Oracle parallel Server in an Active/inactive configuration, and triggers a fast local fail over to the Inactive Oracle instance in the event of a failure of the Active Oracle instance at the Primary Site. At the Standby Site, the Oracle Component manages the Oracle Standby Database that is running at the Standby Site, including the application of archive log files that are being generated by the Oracle database at the Primary Site.

Business Copy (BC) Operations Component

The Business Copy Operations Component is responsible for periodically taking "Business Copies" (BCs, which is a disk backup) of the Oracle database, at both the Primary and DR Sites, to enable more rapid recovery and restoration of 2-safe operations.

Archiving Component

The Archive Log Handling Component is responsible for the management of Oracle archive log files at both the Primary and Standby Sites. At the Primary Site, the Primary Archive Component (PAC) manages the propagation of the Oracle archive log files to the Standby Site. At the Standby Site, the DR Archive Receiver Component (DARC) manages the reception of the archive logs from the Primary Site, and the copying of those archive logs for use by the Oracle Standby Database at the Standby Site.

Tuxedo Component

The Tuxedo Component is responsible for managing customer applications and their communication with the Oracle database at the Primary Site.

Service Navigator Component

Overview

The 5nines architecture includes a comprehensive management system that monitors the servers, storage, middleware, Oracle databases, and networking equipment for problems that may lead to service disruption. The Operations monitoring and a management framework is built around OpenView's IT/Operations (ITO) enterprise console and the Service Navigator product.

Service Navigator tracks the environment from a service perspective. Service Navigator propagates events following a user-defined service hierarchy. The Service Navigator product allows the operator to quickly identify problems with key services, and methodically diagnose which underlying components are causing the problem. These mechanisms are being extended for 5nines to include additional capabilities integrated with the 5nines control components.

Fault events and traps are generated by different sub-systems (network elements, systems, network devices, logfile encapsulation, Monitor scripts, . . . ) and typically reflect a problem with one or more components. Even in a redundant 5nines environment, these component failures need to be attended to by the operations staff. Failure to replace or fix a problem component in a timely fashion may lead to downtime on a subsequent loss of an alternate component (due to a second defect or even a planned maintenance).

Component faults and traps are managed and monitored by IT/Operations and offer operators the possibility to oversee all events on a defined environment. The operators will typically be assigned the responsibility for a given set of component groups (called message Groups in IT/O) for which they are considered to be specialists.

Service Views

A 5nines environment requires an additional view on the infrastructure: a service view. Indeed, a failed redundant component, which results in a critical event to the component view, does not bring down the service that depends on it. In this case there are no downtime penalties, there is no need to raise the operators' level of attention fro that service above the normal operational one. Within the component view (offered by ITO/NNM) the object would be colored "red," reflecting the presence of a critical event. In the service view, we would see the service is represented in a different color (e.g. yellow, not green as the service is vulnerable now to a second failure). The "yellow" color reflects the fact that a single component, on which this service depends, is down but the service is still available. Colors are used to classify the current state of the service. Within the 5nines architecture Service Navigator is the tool that represents service trees and is used to represent the service view. Service navigator provides the operator a visual perspective on the overall availability of services.

Implementing service views requires that the management environment map all relevant components to services. Additionally, key component events are tagged as service events, so that it becomes possible to view those events that determine the actual state of the service. Smart Plug Ins (SPI) which monitor events and manage performance of key components of the 5Nines infrastructure such as XP256 storage, the OS, Oracle database, Tuxedo, Cisco devices, etc. . . . typically provide a large part of that functionality. SPI's add a level of intelligence to the management framework by interpreting hard to understand error codes and emitting easy to understand application events. Together with the error analyzer components, the SPIs, and the local and global control components, the 5Nines architecture takes automatic corrective actions.

All services have a state attribute attached to them (e.g. "UP," "DOWN," "OFF-LINE," "ONE-SAFE," . . . ).

This sample shows a typical service hierarchy with the two main sources of information:

Application Services

Figure 4:
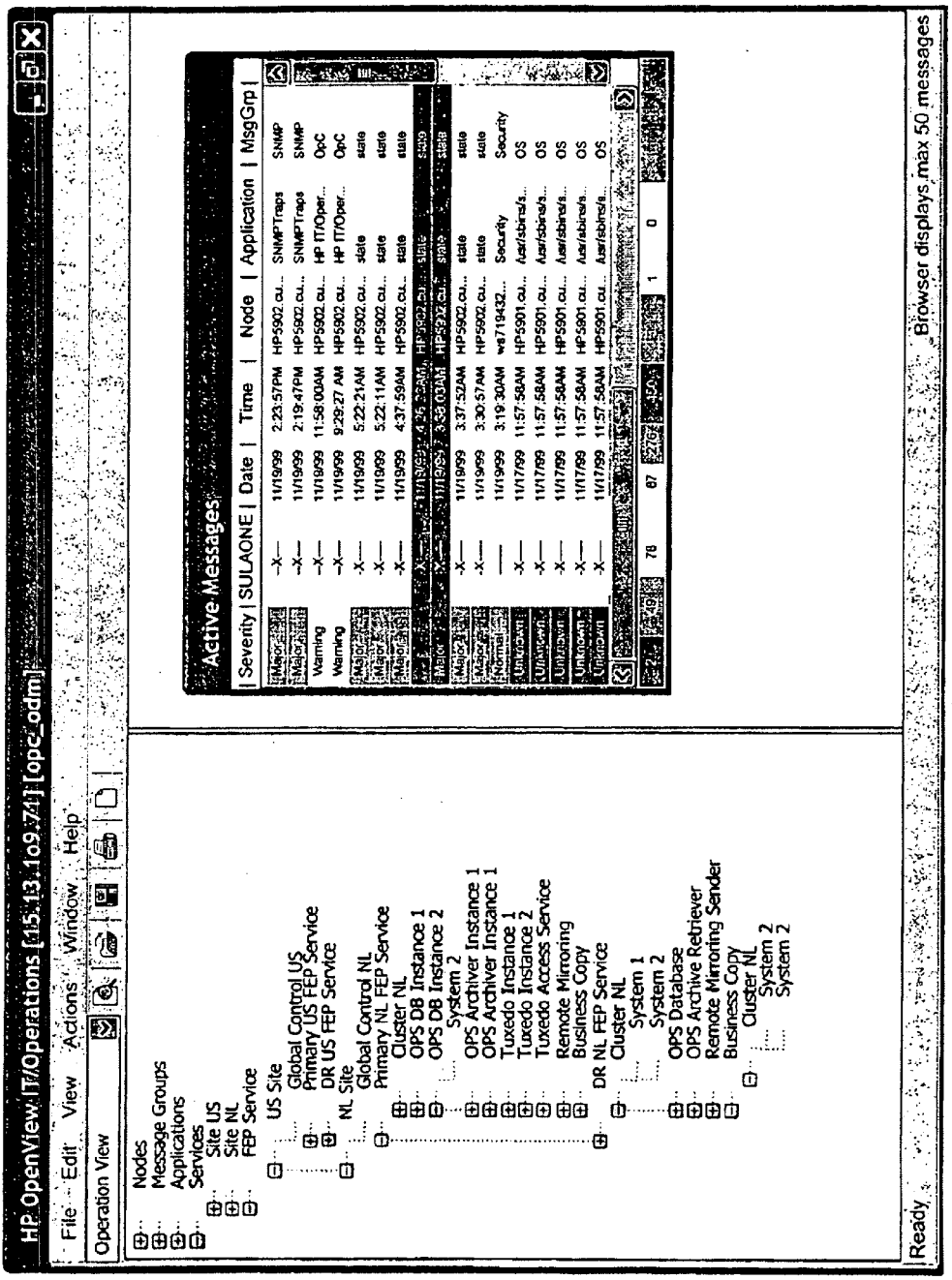
FIG. 4 shows a sample service navigator display.

The application service view is shown in FIG. 4. In this sample FEP service is depicted with both the "US Site" and "EC Site" site service as dependent services. Both FEP service sites are operational (color "green"). The "Primary US FEP Service" and the "DR EC FEP Service" are colored "orange," which indicates the fact that they are not operational as their parent service "US Site" and "EC Site" is fully operational (color "green"). Subsequently, it is also clear that the US Site currently holds the "DR FEP Service" while the Netherlands runs the "Primary FEP Service."

Additionally, application services have dependencies on infrastructure services. This is shown in the screen print by zooming out the "DR EC FEP Service" which as a whole has a dependency on the "Cluster EC" infrastructure and the "Business Copy" service which also depends on the same cluster. Services that depend on a cluster typically can switch between the different nodes of the cluster.

Alternatively, some services run on only a single node and are either active or non active. This is illustrated with the "OS DB Instance 2" service which is currently active and running on system "System 2."

Infrastructure Services

Figure 5:
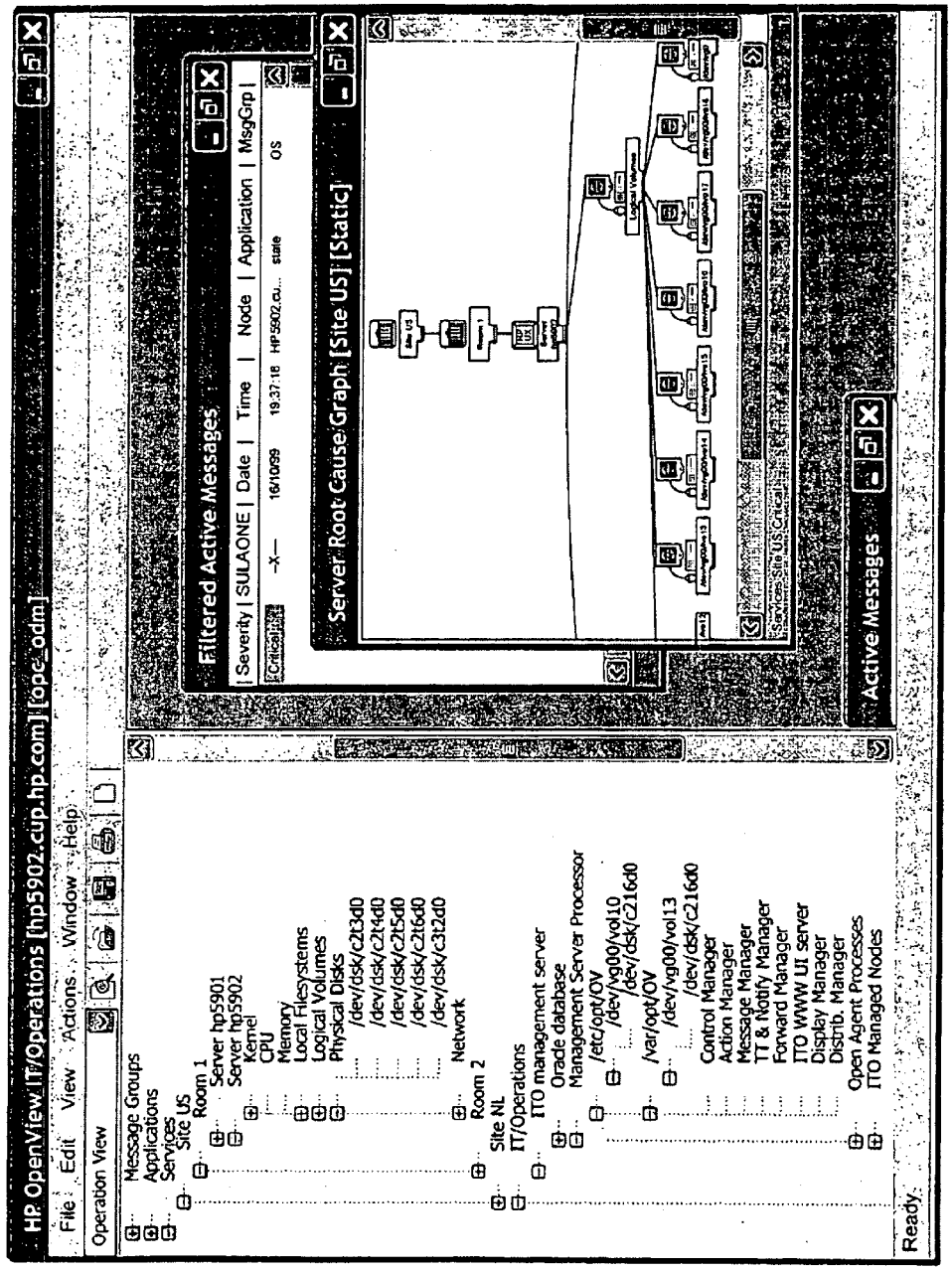
FIG. 5 shows an infrastructure service view.

The infrastructure service view is shown in FIG. 5 and is represented by the "Site US" and the "Site EC" services and their associated computer rooms. Inside of the computer rooms all services are displayed including all sub-services such as kernal, network and file system related. When services go down such as the disk "/dev/dsk/c2t6d00" is this example, it is easy for the operator to see what services are impacted. Conversely, it is possible to find the root cause of any failing service, as shown in this example.

SCENARIOS ILLUSTRATING COMPONENT FUNCTIONALITY

This section describes the functionality provided by the Components by illustrating several examples of how the components respond to events. The examples are intended to show the basic functionality provided by the components, as well as the interactions between components—but are not intended to be exhaustive in covering all cases of event handling.

Primary Site

Startup Sequence of the Functional Components

ServiceGuard starts the Local Control Component on cluster start.
Global Control tells Local Control to resume.
Local Control starts Remote Mirroring. Remote Mirroring returns the status code to Local Control.
Local Control starts Primary Archive Component (PAC). PAC returns the status code to Local Control.
Local Control starts Oracle Component. Oracle Component returns the status code to Local Control.
Local Control starts BC component. BC Component returns the status code to Local Control.
Local Control starts Tuxedo. Tuxedo returns the status code to Local Control.

Replication of Archived and Online Redo Logs From Primary Site To The DR Site

Users connect to Oracle database through Tuxedo. Oracle generates redo log files and archives them. The Remote Mirroring Component in conjunction with the Primary Archive Component (PAC) transmits the online and archived redo logs to the DR site, thus generating a consistent set of archived and online redo files at the DR site.

When a new archived redo log becomes available on the DR Site, the PAC notifies the DR Site Archive Receiver Component (DARC). The sequence of events is as follows. The PAC sends a message to the Oracle Component to find out if the last log is complete. It uses the Status API of the Remote Mirroring Component to detect whether the archive log has completely propagated to the DR Site. When the Status API indicates that the archive has been propagated to the remote DR Site, the PAC notifies the DARC that new archived redo log is available. The DARC notifies the PAC once the log(s) have been forwarded to the Oracle Component for applying or recovering the database.

Taking A Business Copy (BC) Of the Primary Database

The Business Copy (BC) Component is scheduled to take periodic backups of the primary database. It signals the Oracle Component to put the database in backup mode whenever it is ready to take a BC. Once the Oracle Component notifies the BC Component that it has put the database in backup mode, the BC Component takes the BC of the database. It then signals the Oracle Component to take the database out of backup mode. The main purpose of taking a BC on the Primary Site is to provide a starting point for Oracle standby operation on role-reversal.

Remote DR Site

Communication among Functional components:
Startup Sequence of the Functional Components:
ServiceGuard starts Local Control.
Global Control tells Local Control to resume.
Local Control starts Remote Mirroring. Remote Mirroring returns the status code to Local Control.
Local Control starts Oracle Component. Oracle Component returns the status code to Local Control.
Local Control starts DR Archive Receiver Component (DARC). DARC returns the status code to local Control.
Local Control starts BC Component. BC component returns the status code to Local Control.

Recovery Process of the Standby Database by Applying Archived

Redo Logs On The DR Site

The PAC notifies the DARC that new archived redo logs are available on the DR site. The DARC notifies PAC once the log is forwarded to the Oracle component to recover the database.

The Oracle Component puts the Oracle Standby Database into recovery mode, and the Oracle Standby Database applies the available archive logs to the Standby Database.

Taking BC of the Database at the Standby Site

At a pre-configured interval, the BC Component notifies the archive component to prepare for taking a BC. The DARC signals the Oracle Component to stop processing archive logs. It then pauses Remote Mirroring, and notifies the BC Component to take the BC. The BC Component makes a BC copy of the database and notifies the DARC when the BC is completed. The DARC then restarts Remote Mirroring and notifies the Oracle Component to resume.

Timeline for Graceful Transitions

Operator can initiate a graceful fail over or role reversal through the Service Navigator by selecting the Global Control service icon.

Figure 6:
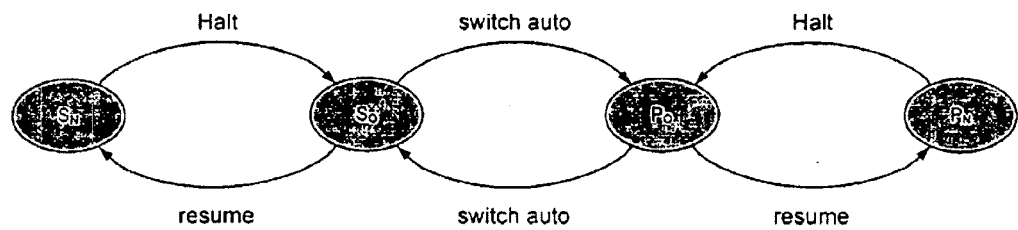
FIG. 6 shows a simplified per-site state diagram.

Table 1 describes the transitions that occur on both the primary and Standby Sites in the process of a "graceful" (planned) transition after which the roles of the services (P=Primary, S=Standby) at the two sites are reversed. That is, before a graceful transition, the Primary Site is supporting Primary Service (the Active/Standby OPS is running at the Primary Site) and the Standby Site is supporting the Standby Service (the Oracle Standby Database is running at the Standby Site). After a graceful transition, the roles of the two sites are reversed. The Global Control component coordinates this transition by issuing a sequence of commands to the two Local Control components. FIG. 6 shows a simplified state diagram for each site, showing the states involved in this transition, along with the commands used to move between States.

TABLE 1

| Time/State | Primary Site | Standby Site |
|---|---|---|
| T0 ($P_N$, $S_N$) | Running normal Active/Standby OPS | Standby Database running in recovery mode |
| T1 ($P_O$, | Shutdown Tuxedo Shutdown BC component | |

TABLE 1-continued

| Time/State | Primary Site | Standby Site |
|---|---|---|
| $S_N$) | Unmount the database<br>Create standby control file<br>Shutdown database in normal mode<br>Ship last archived redo logs<br>Shutdown archive component<br>Shutdown Remote Mirroring | |
| T2<br>($P_O$,<br>$S_O$) | | Shutdown BC component<br>Shutdown archive component<br>Apply remaining archived redo logs<br>Shutdown database in normal mode<br>Shutdown Remote Mirroring |
| T3<br>($S_O$,<br>$S_O$) | Check to see if the old Primary was shutdown gracefully in step T1 (should always be True in graceful case) | |
| T4<br>($S_N$,<br>$P_O$) | Startup Remote Mirroring<br>Startup database as standby with new standby control file (having changed init.ora to point to standby control file)<br>Startup archive component<br>Startup BC component | |
| T5<br>($S_N$,<br>$P_N$) | | Startup Remote Mirroring<br>Startup archive component<br>Startup database in no mount state (having changed init.ora to point to the new control file location)<br>Create control file<br>Startup database as primary<br>Startup BC component<br>Startup Tuxedo |

Table 1 highlights the start up and shutdown sequence of all the functional components. This sequence is also preserved in the ungraceful role reversal transition.
Global Control Component
Overview of Operation
GCC Environment The function of GCC is to perform planned and unplanned failover to the remote site and to restore 2-safe operation. It acts in conjunction with the local control at each site to perform these actions. Global control invokes only those local control commands that are needed to perform remote failover and restoration of 2-safe operation. For example, it does not invoke local control commands to perform node or disk failover.

Global control runs on the management server cluster. There is an instance of global control running in the management server cluster at each site. Each instance runs as a package in Service Guard. In additional to the GCC, the SG package also contains the ITO-based Error Analyzer (EIAC).

There is no coordination or communication between the two instances of global control. Only one instance of GCC is expected to be active at a given time—the instance that runs at the management cluster on which ITO is active. GCC receives commands from the IEAC and from actions configured into the GCC service in ITO Service Navigator. On the inactive management cluster, IEAC will not receive any messages from the 5Nines components on the Application clusters and hence will not issue any command to GCC. Also, the operator is not expected to invoke any service actions from Service Navigator on the inactive management cluster. So, GCC on this cluster will not receive any commands and will be inactive.

GCC COMMANDS

Figure 7:
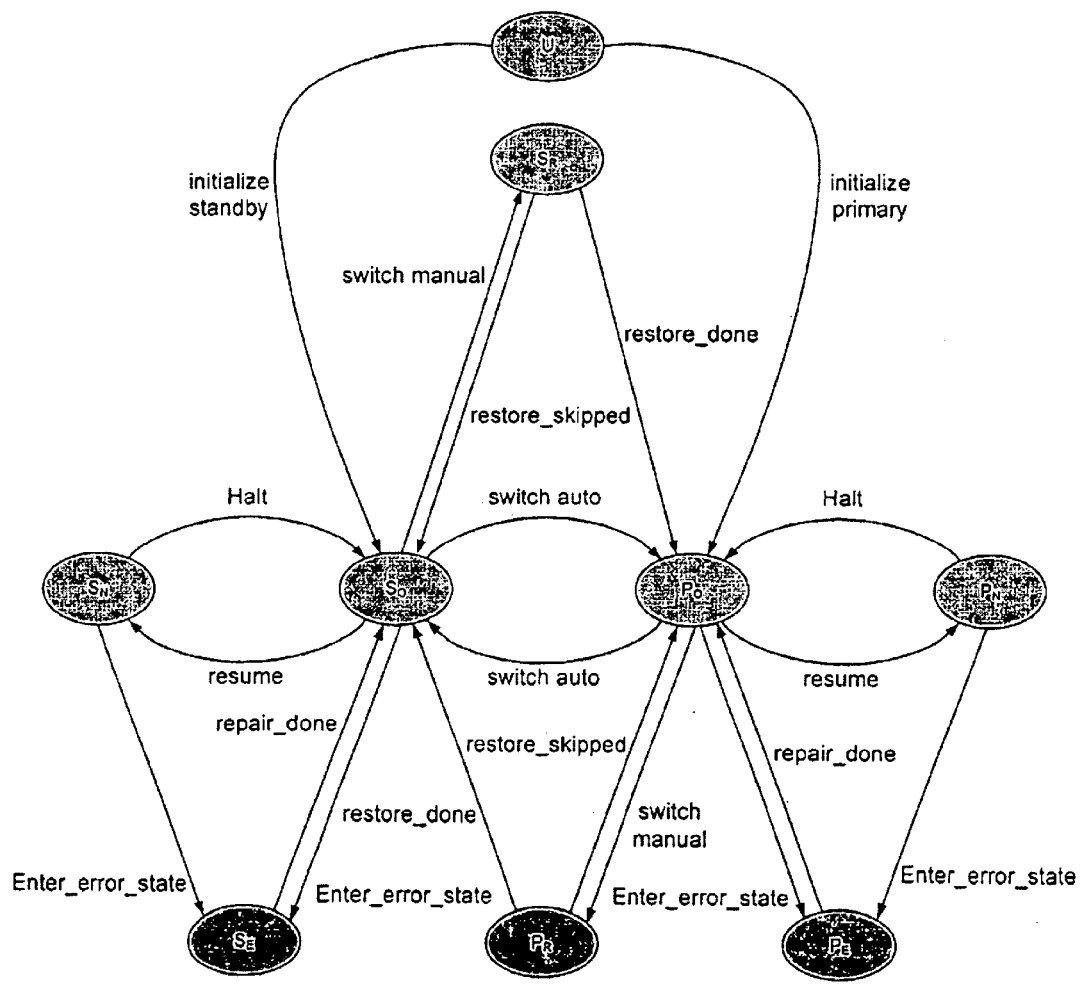
FIG. 7 shows LCC state transitions.

There are 3 meta-commands in the Global Control command menu (Table 2). These meta-commands are available as service actions configured into the GCC service in Service navigator. Each meta-command is executed by GCC as a sequence of component steps. Each component step involves invoking an LCC command at one of the sites causing an LCC state transition at that site. FIG. 7 shows the LCC state diagram. The 3 meta-commands are:

TABLE 2

| GLOBAL CONTROL COMMAND | INVOKING ENTITY |
|---|---|
| Graceful failover (role reversal) | Operator |
| Unplanned failover to remote 1-safe | Operator, 1EAC |
| Restore 2-safe | Operator |
| Cancel | Operator |
| Shutdown | Package halt script |

Planned Failover (role reversal)
Unplanned Failover
Restore 2-safe

In addition, there is a cancel command to cancel the current meta-command and a shutdown command invoked from the Service guard package halt script to shut GCC down.

META-COMMANDS

Graceful Failover

The operator invokes this meta-command. It must ensure
No transaction loss
  GCC shuts the primary cluster down gracefully. This ensures that the redo log for all transactions has reached the standby cluster.
  GCC then shuts the standby cluster down gracefully. This ensures that the standby instance is able to apply all received redo successfully.
no exposure to 1-safe
  GCC starts the new standby before the new primary
no period of longer unplanned failover item following graceful failover
  GCC starts the new standby from production files and not from a business copy (BC). If a BC were used, then the time to apply redo to catch up to the point f graceful failover would have to be added to the delay for a remote failover event (back to the old primary) occurring shortly after the graceful failover.

Below, we show the states through which this command sequences the two LCC instances, along with the local control command needed to accomplish each state transition (assuming that we start with site 0 in primary state and site 1 in standby state):
($P_N$,$S_N$)//initial state
($P_O$,$S_N$)//halt to site 0
($P_O$,$S_O$)//halt to site 1
($S_O$,$S_O$)//switch auto to site 0
($S_O$,$P_O$)//switch auto to site 1
($S_N$,$P_O$)//resume to site 0
($S_N$,$P_N$)//resume to site 1

Unplanned Failover

This meta-command can be invoked by IEAC or by the operator. The old standby site must be in state $S_N$. In some scenarios, unplanned failover is invoked with the primary site still in state $P_N$ (not $P_O$ or $P_E$). The primary site will still have its existing client connections and new clients could also connect to it. Therefore, as the initial step in unplanned failover GCC puts the primary site in state $P_O$ by issuing the halt command to LCC at that site. As a result, any existing client connections are destroyed and new connections refused. If this step is not performed, there is a risk of 'split-brain' syndrome across the two cluster sites, with both sites simultaneously trying to perform the role of primary.

However, in other scenarios, GCC will not be able to contact the LCC to ensure that the primary site is in state $P_O$ or $P_E$. For example, the site may be down (e.g. due to a disaster or the operator having shut down the cluster of 5nines software). GCC will be unable to complete the first step and hence the unplanned failover will not proceed further. However, unplanned failover can be invoked with an option (the 'ignore primary' option) that makes GCC omit the initial step of the halt of the old primary site. It is the responsibility of the invoking entity (the operator or EAC) to ensure that 'split-brain' will not occur if this option is used. The operator or IEAC will use this option if it is known that the primary site is already in a state where client connections are not possible (the site is in state $P_O$ or $P_E$, the 5Nines software has been shutdown, or the cluster itself is down).

After the optional halt of the old primary site, the unplanned failover sequences the old standby site (assumed to be site 1) through the following states:
$S_N$//initial state
$S_O$//halt to site 1
$P_O$//switch auto
$P_O$//resume to site 1

Restore 2-safe

The operator invokes this meta-command after an unplanned remote failover. The old primary site is restarted in the standby role.

The new primary site is required to be in state $P_N$. GCC sequences the old primary site (assumed to be site 10 through the following states:
$P_O$//initial state
$S_O$ or $P_R$//switch auto or switch manual to site 1, depending on whether the old primary was shut down gracefully or not; in the latter case, the operator intervenes to restore from a VC taken at a point in the redo stream prior to the starting point of the new primary, and issuing the restore_ done command to site 1, taking it to state $S_O$
$S_N$//resume to site 1

Automatic versus Manual Execution

GCC meta-commands may be executed manually or automatically. In manual mode, operator intervention is required to confirm that GCC should perform the next step of the meta-command.

In order to perform the sequence of steps involved in a meta-command, we make use of the ITO capability of manual or automatic execution of an action associated with an ITO message.

The initial stimulus to start a meta-command comes from IEAC (issuing a request of unplanned failover or form the operator selecting a service action for GCC in the Service navigator).

When the GCC process receives a meta-command, it always performs only the next step of the meta-command. After successfully completing the step, it generates an ITO message with an associated action of issuing the same meta-command again (assuming that this was not the last step). This message by default will have the associated action be invoked manually; the customer may choose to automate the action.

LCC Environment

The figure below shows the environment in which the LCC operates. Commands may arrive at the LCC from
The operator, using the Service Navigator action menu for LCC at the active management cluster
The GCC instance running on the active management cluster
CEAC, running on the local application cluster and in the same SG package as LCC
IEAC, running on the management cluster LCC Initialization Before the control component (LCC-CEAC-SSC) shown in FIG. 8 can be launched, LCC must first be run in initialization mode. This initialization component is composed of LCC and SSC only. The initialization component must be invoked prior to control component startup. The initialization component sets a flag in persistent storage to alert the control component, when it subsequently launches, that a startup rather than a failover has occurred. As a result, the LCC in the control component will know to wait for a command from the operator/GCC to either resume the old service or switch to a new service. (It should not blindly continue the old service on startup, since an unplanned remote failover may have occurred while the control component was down).

The initialization component is now shut down, having set the stage for the launch of the control component. The initialization component and the control component are mutually exclusive, in the sense that one will not launch successfully if the other is running.

LCC State Diagram

Figure 8:
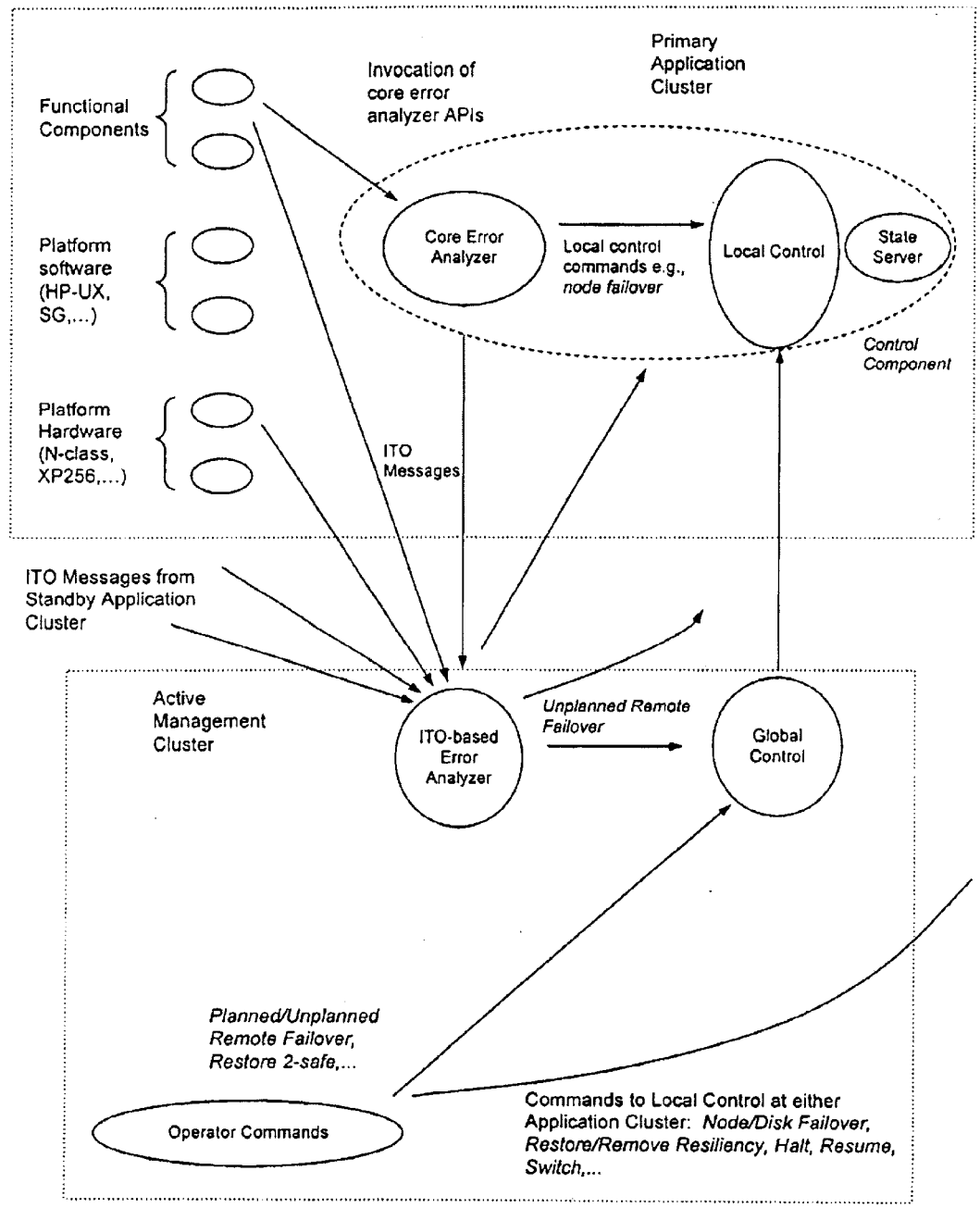
FIG. 8 shows the local control environment.
Figure 9:
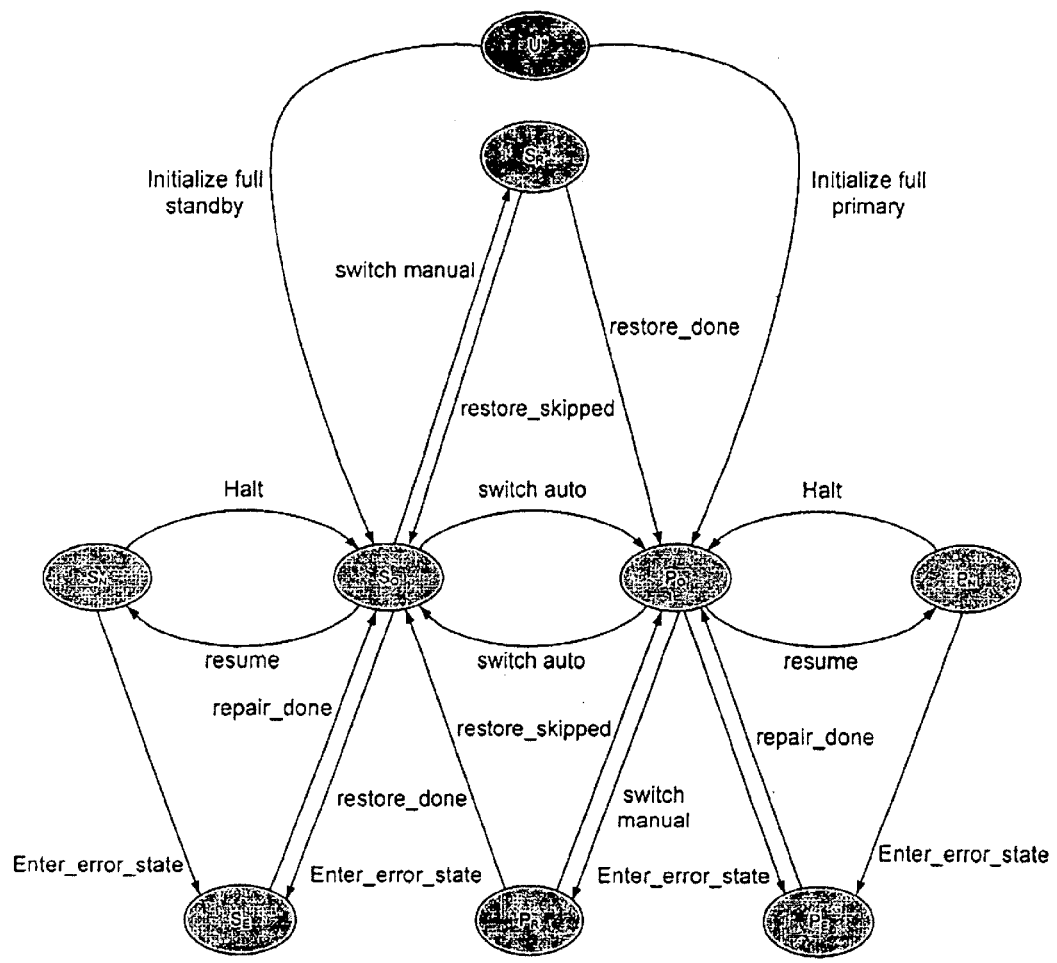
FIG. 9 shows LCC state transitions.

In this section, we introduce the states in which the LCC component may be in, when the control component (LCC-SSC-CEAC) is running (see FIG. 8).
There are two main service types P (primary) and S (standby), apart from the service type corresponding to unknown (U). The internal persistent storage of LCC always shows it as providing one of these services. For service P and S, a number of LCC states are defined.
In state normal, LCC runs the functional components appropriate to the service.
The operator/GCC can direct LCC to halt the service it is providing. LCC stops all functional components in response. The service provided remains the same but it is offline (O). The halt command takes a quick/graceful option that is interpreted in a service-specific way. For service P, a graceful halt will attempt to ensure that all redo is sent to the standby site. For service S, a graceful halt will attempt to apply all redo. In state offline, when the LCC is directed to resume, the components are restarted and the state goes back to normal.
Instead of resuming, the operator/GCC can direct LCC to do a role reversal, by issuing the switch command with the auto option. Role reversal refers to the service changing between P and S. LCC is now providing the new service, in state offline. The operator/GCC can now direct LCC to resume to get the functional components for the new service started (state normal).
The switch may require manual intervention (typically involving a restore from a BC). In this case, the switch command with the manual option is used. LCC retains the old service but goes to state restore. The operator now performs the restore and related steps and then invokes restore_done. LCC is now in state offline for the new service. Alternately, the operator may skip the restore and invoke restore_skipped. LCC now in state offline for the old service.

LCC goes into state error(E) when it runs into failures it cannot recover from, or as a result of a request from the CEAC. In this state, local control runs a service-specific containment script. The operator intervenes to correct any problem, and then invokes repair_done to local control. LCC then halts any functional components that may be running and to state offline. The components that are running in each state are shown in Table 3.

TABLE 3

| LOCAL CONTROL SERVICE | LOCAL CONTROL STATE | COMPONENTS THAT ARE RUNNING |
|---|---|---|
| P or S | Normal | Control component (LCC-SSC-CEAC) components |
| P or S | Offline | Control Component |
| P or S | Error | Control component, all functional components that were running at the time of error minus any that terminated |
| P or S | Restore | Control Component |
| U | N/A | Control Component |

If LCC starts up with persistent storage uninitialized, the service is set to unknown (U). The operator must request full reconfiguration and choose between the primary and standby service. In response, LCC will fully reconfigure itself and set the state to offline in the requested service. On the next transition to state normal in that service via a resume, all the functional components will fully reconfigure themselves.

Partial or full reconfiguration of 5Nines can also be requested in state offline of the primary and standby services, but without specifying a service. In response, LCC will reconfigure itself partially or fully. On the next transition to state normal in that service via a resume, all the functional components will reconfigure themselves partially or fully.

The commands that cause LCC in the control to perform the state transitions shown in FIG. 7 are shown in Table 4.

TABLE 4

| LOCAL CONTROL COMMAND | INVOKING ENTITY |
|---|---|
| Switch manual/auto | GCC, Operator |
| Resume | GCC, Operator |
| Halt quick/graceful | GCC, Operator |
| Enter error state | Operator, CEAC |
| Repair_done | Operator |
| Restore_done | Operator |
| Restore_skipped | Operator |
| Reconfig partial/full [primary/standby] | |

The control component can be gracefully shut down when in state offline (See Section Control Component Shutdown). If the control component itself, or the node it is running on, fails and SG is unable to fail it over, it aborts.

Before the control component is launched again, the initialization component must be run. When the control component is launched, the service will be whatever it was when the control component shut down.

If the service was P or S, and the state was normal or offline at shutdown, the starting state will be offline on startup, since a role reversal may have occurred in the interim. If the state was error or restore at shutdown, it will continue to be the same after startup.

FUNCTIONAL COMPONENTS

The control component is responsible for starting up, shutting down and failing over the functional components. Each of the services P and S defines its specific set of components. Each component is a Service Guard package.

There are 2 types of functional components: bound and unbound

A bound component is configured to run on a specific node in the cluster. If only this node is specified as capable of running the component (1-node bound), the component will never be failed over. If the other node is specified as an alternate node for running the component (2-node bound), it will be failed over when the component's primary node fails. When resiliency is restored to the cluster, the component will be failed back.

An unbound component is configured to run on both nodes in the cluster. At all times it runs on the same node as the control component, the active node. It is failed over when the active node fails, but is not failed back automatically when resiliency returns to the cluster.

The service S uses only unbound components, the service P uses a mixture of unbound, 1-node bound and 2-node bound components Since Service Guard does not currently provide a way to specify the order of package startup of shutdown r failover, LCC provides the capability. Hence automatic startup and failover are disabled in SG for all functional packages, so that LCC can determine the order of launching these packages on startup and failover, as well as the order of shutdown. The control component itself is failed over by Service guard.

The functional components should be started up only by LCC. They should only be stopped by LCC, except in state error, in which the operator may stop functional components as desired.

The node that the control component runs on (the active node) corresponds to the active OPS/Tuxedo instance at the primary site and the standby Oracle instance at the DR site.

SG fails over the control component, if the node on which it is running, fails. The failed over control component will start up the appropriate functional components (unbound and 2-node bound) on the new active node.

Node Resiliency

LCC maintains the notion of node-resiliency. Only when LCC is node-resilient will local node failover be permitted by LCC. A necessary, but not sufficient, prerequisite for LC to be node-resilient is that the SG cluster should be resilient, i.e. both nodes must be active in the SG cluster. The following events impact node-resiliency.

The operator may request removal of node resiliency, e.g. to perform maintenance on the active node. CEAC may request removal of node resiliency if the inactive node reports errors. The inactive node may leave the cluster due to hardware, software or network failure. In response to these events, LCC shuts down functional components on the inactive node (if needed), or fails them over to the active node. LCC is now non-node-resilient.

The operator may request quick node failover, e.g. to perform maintenance on the active node. CEAC may request quick node failover if the active node reports errors. The control component may itself fail. The active node may leave the cluster due to hardware, software or network failure. In response to these events, LCC shuts down functional components on the active node (if needed), or fails them over to the formerly inactive node. The control component now runs on the formerly inactive node. LCC is now non-node resilient.

The operator may request restoration of node resiliency. Both nodes must be active in the SG cluster. In response, LCC starts up any functional components that run on the inactive node. LCC is now node-resilient.

Local Node Failover

Local node failover may occur as follows:

An explicit operator command is given to LCC to perform a quick or graceful node failover CEAC initiates an explicit quick node failover by sending LCC a command.

The control component package fails while LCC is node-resilient; this results in an implicit quick failover.

A software or hardware failure of the active node while LCC is node-resilient causes the node to leave the SG cluster; this results in an implicit quick failover In all these cases, SG restarts the control component on the newly active (formerly inactive) node. In the cases where LCC receives an explicit command to failover, the LCC daemon exits, causing the SG package containing the control component to fail and triggering the restart.

In the quick node failover cases, the restarted LCC ensures that all 1-node bound components on the formerly active node are halted. It fails over the unbound components and those 2-node bound components that have the formerly active node as their primary node (by halting them and restarting them on the newly active node). LCC is now non-node-resilient. When the node resiliency is restored (via operator command), the 2-node bound components are failed back, by halting them and restarting them on the new inactive node.

In the graceful failover case, LCC fails over only the unbound components and remains node-resilient.

LCC commands related to node resiliency and node failover are shown in Table 5.

TABLE 5

| LOCAL CONTROL COMMAND | INVOKING ENTITY |
| --- | --- |
| Node Failover quick/graceful | Operator, CEAC |
| Remove Resiliency quick/graceful | Operator, CEAC |
| Restore Resiliency | Operator |
| Shut down control component | Package halt script |

COMMAND CONCURRENCY

It would be simplest if commands could be executed serially. However, high availability is improved if some amount of non-serial logic is allowed.

Consider the "graceful node failover" command as an example. The control component fails over to the old inactive node or the new active node, taking the unbound components with it.

Suppose a component on the new active node reports a failure before the startup of all the unbound components is complete, and that this failure causes CEAC to request LCC to do a quick node failover to the old active node. If LCC were fully serial, it would have to complete the startup of all the unbound components before doing the second failover (or failback). The attempt to start up the bond components may fail if they have a dependency on the failed component and package start timeouts may occur. To restore quick service, it would be best if the startup of the unbound components was cut short and the second failover started right away. This approach is not serial in that the arrival of the second command causes the first to abort. Note that the second command would have to deal with the complexity of not having the standard complement of components running when it starts.

The non-serial approach causes design complexity to increase and the number of test scenarios increases substantially also.

In this design, we avoid the complexity of the non-serial approach. LCC goes into state error if the command that is currently being executed, is interrupted by the arrival of another.

The command structure has three slots, each of which can hold one command (see Table 6):

TABLE 6

| Slot Number | Command which can be placed in the slot |
| --- | --- |
| 2 | Enter Error State |
| 1 | Remove Node Resiliency quick, Quick Node Failover |
| 0 | Any other command |

Each of the commands shown in Table 4 and 5 can go in only a specific slot in the command structure. A command can only go into a given slot, if the slot is free and all higher numbered slots are also free, otherwise the command is rejected with a busy indication. For example, a resume command arriving when LCC is performing a command to 'remove node resiliency,' will be rejected in this manner. When a command is complete, the slot it is occupying is freed. A client receiving a busy indication may choose to send a command corresponding to a higher numbered slot.

LCC has a dispatcher thread that receives incoming RPCs and populates the command structure as discussed above. It has a worker thread that scans the structure and performs the contained commands. Potentially, the worker thread could modify the execution of a command if it sees a higher numbered slot occupied. For example, when executing a resume (slot 0), if a 'remove node resiliency quick' command is seen (slot 1), the worker thread could start up the components corresponding to non-resilient mode.

However, in the first release, the worker thread will take LCC into state error in such scenarios. When the worker thread is performing a command, it examines the command structure to see if it should do so at appropriate points in its logic (e.g. when it has finished starting up or shutting down a package).

When a command is complete, the result is stored into a persistent array of command results. The client submitting the command has to get the result from this array.

CONTROL COMPONENT SHUTDOWN

The operator may wish to shut the control component down for maintenance operations.

The recommended operator procedure is to first ensure that LCC is in state offline and that there are no other commands executing (LCC is idle offline). Then the operator may invoke the shutdown command. This is the Service Guard cmhaltpkg command for the control component. Service Guard executes the corresponding halt script, which includes an invocation of a shutdown RPC supported by the LCC daemon.

If the operator has issued a shutdown in the recommended manner, the LCC daemon on getting the command will find the state to be offline and that no commands are executing, and exit.

A goal of the design of the control component is to ensure that the control component does not get shut down before all the functional components are shut down. So if the operator tries to shut down the control component when LCC is not idle offline, it goes into state error. However, we have to keep in mind that the halt script is also invoked during node failover. For example, if CEAC fails, the control component package would fail, causing SG to run the halt script. Here, it would not do to go into state error, if LCC were not in state offline when the shutdown RPC arrives.

Hence, when the dispatcher thread receives the shutdown RPC, it determines if the component is being failed over or shutdown.

If SG has not disabled global package switching for the control component, then the dispatcher thread considers that a failover is being attempted. It processes the command in the same way as if a quick node failover had been requested.

If SG has disabled global package switching for the control component, the dispatcher thread behaves as if a shutdown request has been received.

Although the present invention has been described in terms of a particular embodiment, it is not intended that the invention be limited to this embodiment. Modifications within the spirit of the invention will be apparent to those skilled in the art. For example, an almost limitless number of 5Nines:5Minutes architecture implementations are possible, using any number of programming languages, modular organizations, data structures, and software design strategies. A large number of implementation strategies may be employed, including full de novo implementation and implementation based on existing components. Many different mappings of 5Nines:5Minutes functionalities onto computer systems are possible.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A highly available transaction processing system comprising:
   a primary transaction processing site that includes hardware and software components for processing transactions on behalf of client computers;
   a standby transaction processing site that includes hardware and software components for processing transactions on behalf of client computers and that is continuously updated with data to reflect the data state of the primary transaction processing site; and
   and management components and services that map software and hardware components of the primary transaction processing site and the standby transaction processing site to a set of transaction-processing services, that monitor the primary site for software and hardware errors, that determine when sufficient software and hardware components have failed to prevent one or more services from being provided to clients from the primary transaction processing site, and that fail over the primary site to the standby site in order to continue transaction processing at the remote site when a service failure that prevents continued transaction processing is detected on the primary site.

2. The highly available transaction processing system of claim 1 wherein the management components and services include a service state display component that displays the operation status of the hardware and software components of the primary and standby sites.

3. The highly available transaction processing system of claim 1 wherein the management components and services include an interface that allows an application program to determine the status of a data replication operation that replicates data stored by a primary site device on a remote site device.

4. The highly available transaction processing system of claim 1 wherein the management components and services include a rapid database failover and restoration component that fails over database processing from the primary site to the standby site without data loss.

5. The highly available transaction processing system of claim 1 wherein the management components and services include a service-navigator component that provides a hierarchical, graphical view to administrators and operations-staff personnel of the services and hardware and software components that implement the services that together make up the highly available transaction processing system in order to allow administrators and operations-staff personnel to visually assess impacts of failures of software and hardware components to the services.

6. The highly available transaction processing system of claim 1 wherein the management components and services include local control components resident on the primary transaction processing site and on the standby transaction processing site, the local control components coordinating operations local to a transaction processing site that are invoked upon local failover and other system-related activities.

7. The highly available transaction processing system of claim 6 wherein the management components and services include a global control component that coordinates operation of the local control components at each transaction processing site.

8. The highly available transaction processing system of claim 1 wherein the management components and services include an error-analyzer component that receives error messages sent to the error-analyzer component by software and hardware components of the primary transaction processing site and standby transaction processing site, that analyzes the received error messages to determine appropriate error recovery actions, and that initiates error-recovery actions in response to receiving and analyzing the error messages.

9. The highly available transaction processing system of claim 1 wherein the management components and services include a remote mirroring component responsible for replicating data by redundantly writing data to both local storage devices and remote storage devices.

10. The highly available transaction processing system of claim 1 wherein the management components and services include a database management component that monitors a database management system resident at the primary transaction processing site and a separate database management system resident at the standby transaction processing site, detecting at the primary transaction processing site database failures that can be remedied by a local failover operation, the database management component running at the standby processing transaction site responsible for application of archive logs generated at the primary site to the database management system of the standby processing transaction site.

11. The highly available transaction processing system of claim 1 wherein the management components and services include an archive-log-handling component that manages database-management-system archive-log files at both the primary transaction processing site and the standby transaction processing site.

12. The highly available transaction processing system of claim 1 wherein the management components and services include a tuxedo component responsible for managing customer applications and communications between customer applications and the database management system running at the primary transaction processing site.

* * * * *